(12) United States Patent
Backman

(10) Patent No.: US 11,043,900 B2
(45) Date of Patent: Jun. 22, 2021

(54) DC-DC CONVERTER, POWER SUPPLY SYSTEM COMPRISING DC-DC CONVERTER AND METHOD FOR CONTROLLING A DC-DC CONVERTER

(71) Applicant: ELTAK AS, Drammen (NO)

(72) Inventor: Nils Backman, Drammen (NO)

(73) Assignee: ELTEK AS, Drammen (NO)

(*) Notice: Subject to any disclaimer, the term of this patent is extended or adjusted under 35 U.S.C. 154(b) by 0 days.

(21) Appl. No.: 16/818,994

(22) Filed: Mar. 13, 2020

(65) Prior Publication Data
US 2020/0220466 A1 Jul. 9, 2020

Related U.S. Application Data

(63) Continuation of application No. PCT/EP2018/073923, filed on Sep. 6, 2018.

(30) Foreign Application Priority Data

Sep. 14, 2017 (GB) .................... 1714806

(51) Int. Cl.
*H02M 3/335* (2006.01)
*H02M 1/10* (2006.01)
(Continued)

(52) U.S. Cl.
CPC ...... *H02M 3/33523* (2013.01); *H01H 15/005* (2013.01); *H02J 9/061* (2013.01);
(Continued)

(58) Field of Classification Search
CPC .............. H02M 3/33523; H02M 1/10; H02M 2001/0058; H02M 1/009; H02M 2007/4815; H02J 9/061; H02J 9/062
See application file for complete search history.

(56) References Cited

U.S. PATENT DOCUMENTS 6,058,026 A 5/2000 Rozman
6,370,050 B1 4/2002 Peng et al.
(Continued)

FOREIGN PATENT DOCUMENTS

GB 2484971 A 5/2012
WO 2015/155203 A1 10/2015

OTHER PUBLICATIONS

The International Search Report of corresponding International application No. PCT/EP2018/073923, dated Nov. 22, 2018.
(Continued)

*Primary Examiner* — Thienvu V Tran
*Assistant Examiner* — Bart Iliya
(74) *Attorney, Agent, or Firm* — J.C. Patents

(57) ABSTRACT

The present disclosure relates to a DC-DC converter (10), comprising a first DC port (10A) connectable to a DC source (B), a second DC port (10B) with a positive terminal (PT), a midpoint terminal (MT) and a negative terminal (NT) connectable to a DC bus (4). A first capacitor (C1) is connected between the positive terminal (PT) and the midpoint terminal (MT) and a second capacitor (C2) is connected between the midpoint terminal (MT) and the negative terminal (NT). The DC-DC converter (10) comprises a first switching circuit (20), a second switching circuit (40) and a resonant circuit (30) connected between the first switching circuit (20) and the second switching circuit (40). The second switching circuit (40) comprises a first switch (Q1), a second switch (Q2), a third switch (Q3), and a fourth switch (Q4).

10 Claims, 13 Drawing Sheets

(51) Int. Cl.
*H02M 7/48* (2007.01)
*H02M 1/00* (2006.01)
*H01H 15/00* (2006.01)
*H02J 9/06* (2006.01)

(52) U.S. Cl.
CPC ............... *H02J 9/062* (2013.01); *H02M 1/10* (2013.01); *H02M 3/33576* (2013.01); *H02M 2001/009* (2013.01); *H02M 2001/0058* (2013.01); *H02M 2007/4815* (2013.01)

(56) References Cited

U.S. PATENT DOCUMENTS

| | | |
|---|---|---|
| 2003/0086280 A1 | 5/2003 | Bourdillon |
| 2016/0190952 A1 | 6/2016 | Lee et al. |
| 2017/0063251 A1 | 3/2017 | Ye et al. |
| 2018/0109136 A1* | 4/2018 | Mouridsen ............... H02J 9/062 |
| 2019/0052177 A1* | 2/2019 | Lu ......................... H02M 7/5387 |
| 2019/0068069 A1* | 2/2019 | Sheng ................ H02M 3/33576 |

OTHER PUBLICATIONS

The United Kingdom Search Report of corresponding United Kingdom application No. 1714806.5, dated Sep. 27, 2017.

* cited by examiner

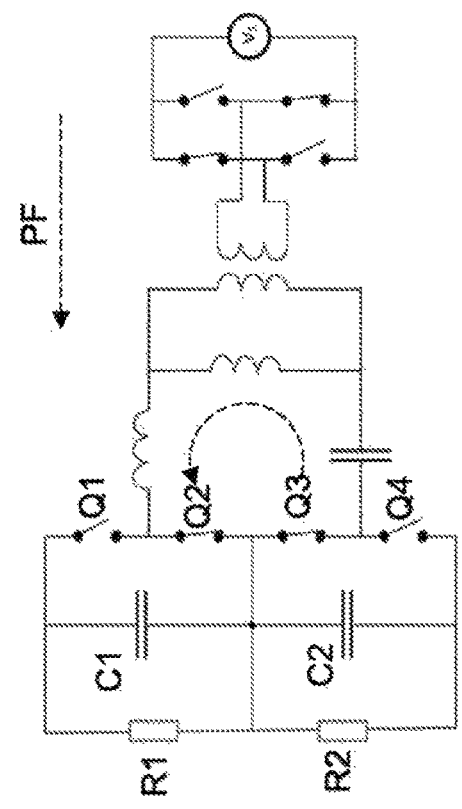
FIG. 7b: Symmetric load, time T2
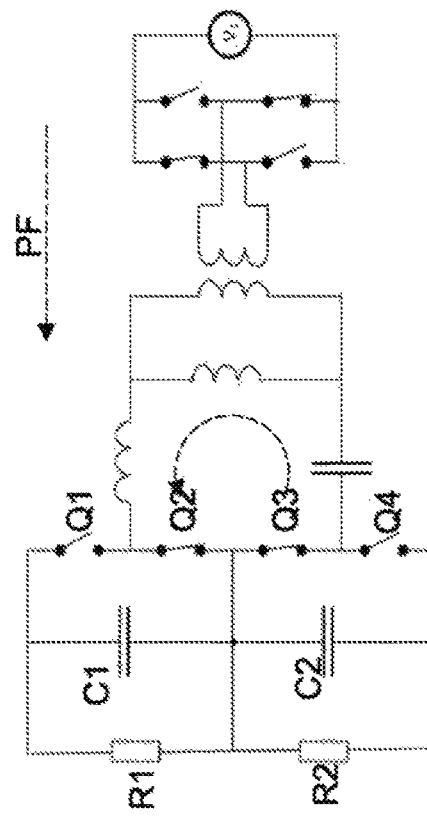
FIG. 7d: Symmetric load, time T'2
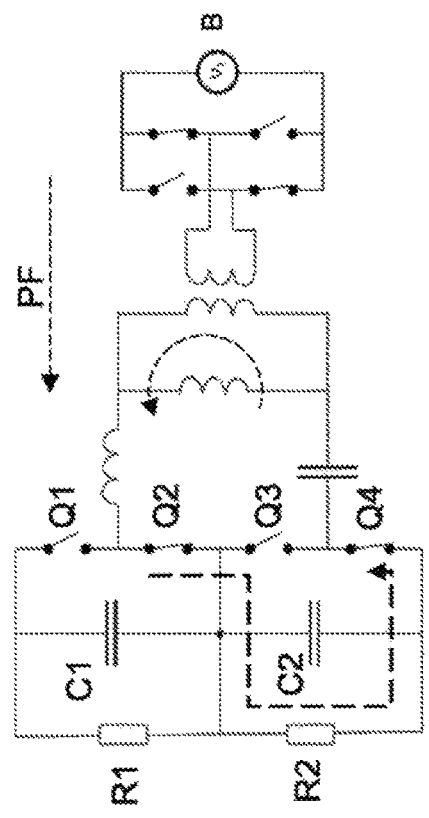
FIG. 7a: Symmetric load, time T1
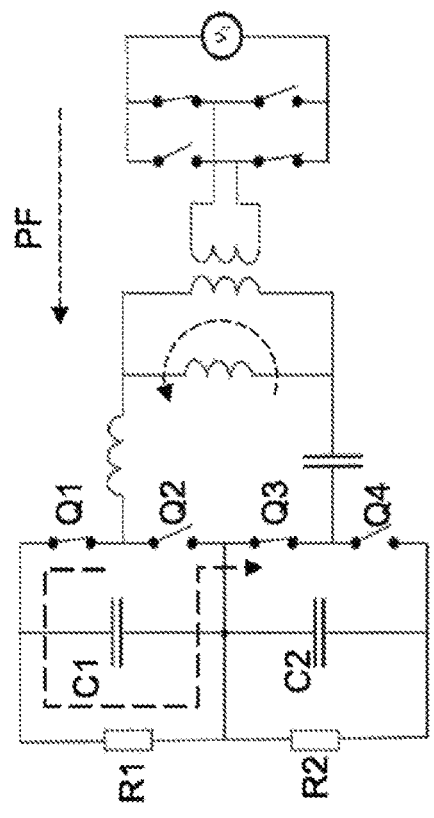
FIG. 7c: Symmetric load, time T3

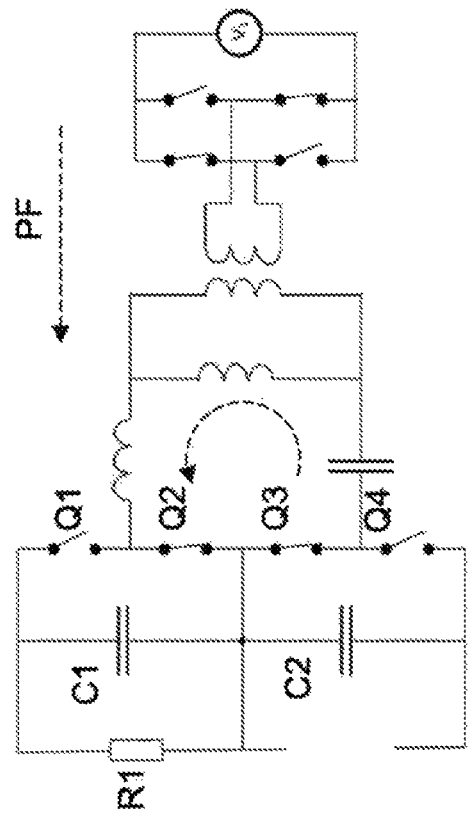
FIG. 8b: Asymmetric load, time T2
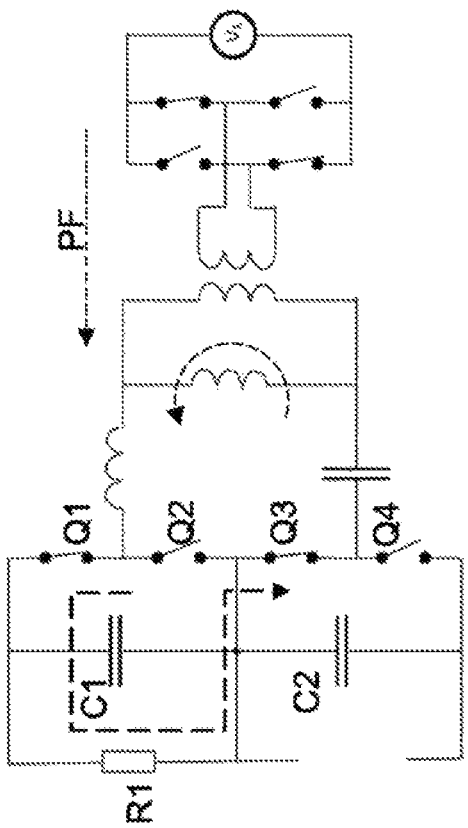
FIG. 8a: Asymmetric load, time T1
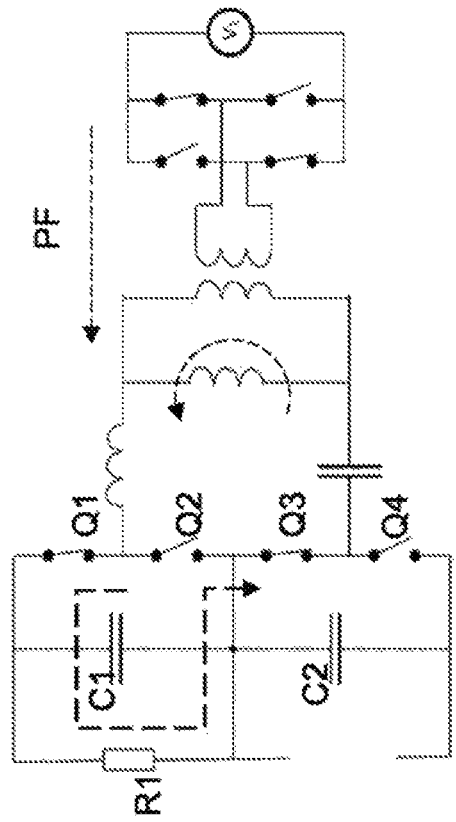
FIG. 8c: Asymmetric load, time T'1

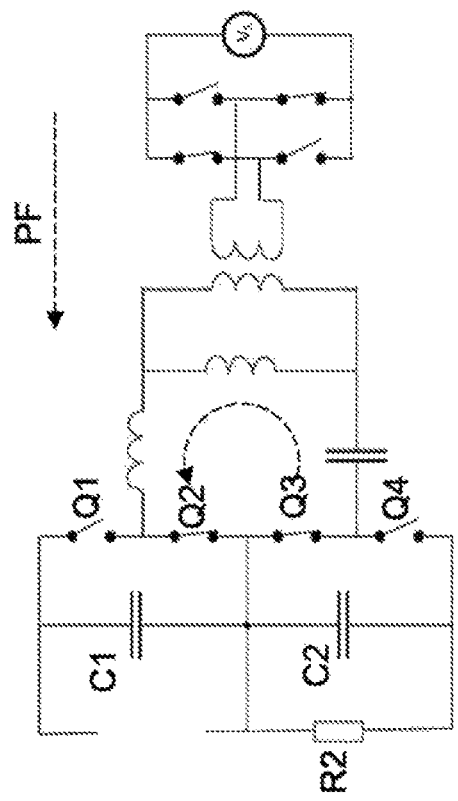
FIG. 9b: Asymmetric load, time T2
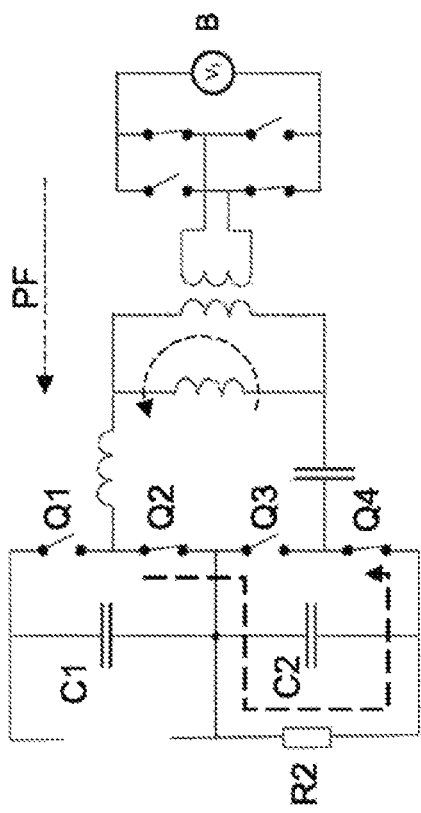
FIG. 9a: Asymmetric load, time T1
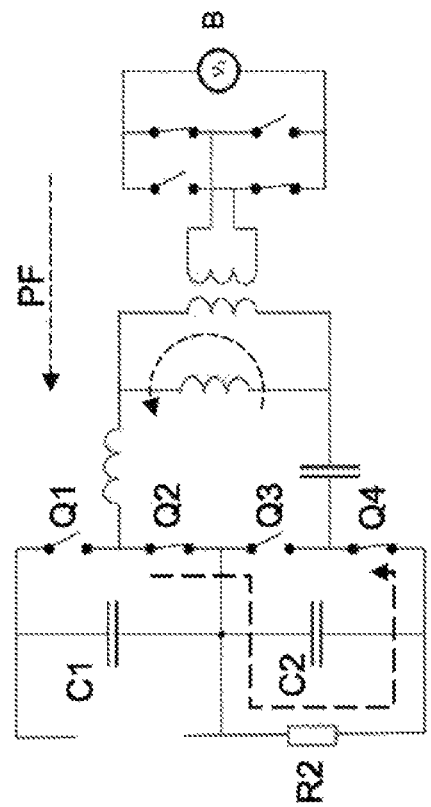
FIG. 9c: Asymmetric load, time T'1

DC-DC CONVERTER, POWER SUPPLY SYSTEM COMPRISING DC-DC CONVERTER AND METHOD FOR CONTROLLING A DC-DC CONVERTER

CROSS-REFERENCE TO RELATED APPLICATIONS

This application is a continuation application of International Application No. PCT/EP2018/073923, filed on Sep. 6, 2018, which claims priority to GB Patent Application No. 1714806.5, filed on Sep. 14, 2017, both of which are hereby incorporated by reference in their entireties.

TECHNICAL FIELD

The present disclosure relates to a DC-DC converter for transferring power from a two-terminal DC bus to a three-terminal DC bus. The disclosure also relates to a power supply system with such a DC-DC converter. The disclosure also relates to a method for controlling such a DC-DC converter.

BACKGROUND

A prior art AC-UPS converter 1 (Alternating Current-Uninterruptable Power Supply) is shown in FIG. 1 as a dashed box, including an AC-DC converter 2, an inverter 3 (a DC-AC converter) and a DC-DC converter 10. An AC-UPS is used when there is need for a reliable AC-supply to critical loads such as a telecom radio base station, or server supporting data-storage and data-transmission in a data/telecom network.

An AC-UPS converter 1 needs at least three ports 2A, 3A, 10A for routing the energy to the critical load L. One port 2A contains the connections to the AC-mains (in FIG. 1 a three phase 400 Vac), the second port 3A contains connections to the AC-load L (in FIG. 1 a one phase 230 Vac) and the third port 10A contains connections to a DC battery B (in FIG. 1-48 Vdc, i.e. a 48 V battery with the positive terminal grounded).

Typically, an AC-UPS will include the AC-UPS converter 1 and one battery B, together with other equipment (racks, cabinets, cooling fans etc.). Hence, as shown in FIG. 1, the battery B is not defined as a part of the AC-UPS converter 1.

It is desirable to have a seam-less transition from AC-grid to DC-battery, or the opposite, without affecting the power supply to the critical AC-load in case of a mains failure.

In FIG. 1, all three converters are connected to an intermediate DC bus 4 with three terminals, a positive terminal PT of +400V, a midpoint terminal of 0V and negative terminal NT of −400V. This arrangement can be configured to achieve a seamless transition of the power flow between mains terminal and battery terminal of the AC-UPS converter 1.

It is now described in more detail how the UPS works in normal operation. In normal operation the AC mains is a source S of energy and the energy flow can be described as follows. The current drawn from AC-mains is regulated to follow the sinusoidal shape and phase of AC-mains voltage by the input AC-DC converter 2 and provides therefore so called power factor correction and the input stage is commonly named the Power Factor Converter, PFC. The output of the PFC is an intermediate and regulated DC-voltage supplied to the intermediate DC bus 4. In the case of interest for this disclosure, the intermediate DC-voltage is split into three levels. The DC-AC converter 3 is converting this intermediate DC-voltage to a regulated sinusoidal AC-voltage to which the critical load L can be connected. In the example of FIG. 1, the DC-AC converter is a three level DC to single phase AC inverter. The DC-DC converter 10 is connected between the intermediate DC bus 4 and the battery B.

It is now described how the UPS works in the case when the AC-mains is failing, in other words when the quality of AC-mains is bad due to an interruption, change of frequency, or is heavily distorted. In this case the battery B becomes the source of energy for the load. The battery B is providing a DC-voltage and the DC-DC converter 10 is providing the conversion from DC battery voltage to the intermediate DC-bus voltage. The DC-DC converter 10 is regulating the current taken from the battery to be a flat DC-current with as little AC-ripple as possible. The DC-DC converter 10 also provides the regulation of the intermediate DC-bus. As described above, the intermediate DC-voltage is split into three levels. This means that the DC-DC shall have the ability to regulate two independent voltages, a positive voltage level, and a negative voltage level. As the intermediate DC bus voltage is input to the inverter 3, the quality of the intermediate DC bus voltage will influence on the quality of the regulated sinusoidal AC-voltage to which the critical load is connected.

In FIG. 2a, it is shown that a first capacitor C1 is connected between the positive terminal PT and the midpoint terminal MT of the intermediate DC bus 4 and that a second capacitor C2 is connected between the midpoint terminal MT and the negative terminal NT of the intermediate DC bus 4. These capacitors C1 and C2 are typically considered to be a part of the inverter, as indicated by the dashed box 3 of FIG. 2a. However, in an AC-UPS converter 1, this is a matter of definition only—these capacitors may be considered as being a part of the AC-DC converter 2, a part of the DC-DC converter or a part of the intermediate DC bus 4 itself. In FIG. 2b, these capacitors C1 and C2 are considered to be a part of the DC-DC converter, as indicated by the dashed box 10.

One known AC-UPS converter is the Rectiverter® from Eltek ASA, which is a three port converter with an AC input port, an AC output port, and a bidirectional DC port.

One object of the present disclosure is to provide an improved DC-DC converter and a method for transferring power from first DC port connected to a battery to a second DC port connected to a DC bus having three terminals.

In particular, the object is to provide an improved DC-DC converter for use in an AC-UPS converter.

Accordingly, the object is also to provide an improved AC-UPS converter.

Yet another object of the disclosure is to reduce costs, either by using fewer electronic components or by using lower-rated electronic components. In addition, it is an object to obtain an as high as possible power efficiency through the converter, i.e. to reduce losses in the converter.

Yet another object is to provide an improved AC-UPS converter exhibiting the advantage of using fewer components for multiple purposes which have lower voltage rating and high efficiency.

SUMMARY

The present disclosure relates to a DC-DC converter, including:
a first DC port connectable to a DC source;

a second DC port with a positive terminal, a midpoint terminal and a negative terminal connectable to a DC bus;
a first capacitor connected between the positive terminal and the midpoint terminal and
a second capacitor connected between the midpoint terminal and the negative terminal;
wherein the DC-DC converter includes:
a first switching circuit including active switches connected between the first DC port, a first node and a second node;
a second switching circuit including active switches connected between the second DC port, a first node and a second node;
a resonant circuit connected between the nodes of the first switching circuit and the nodes of the second switching circuit;
a control circuit for controlling the power transfer from the first DC port to the second DC port by controlling the active switches of the first and second switching circuits;
wherein the second switching circuit includes:
a first switch connected between the positive terminal of the second port and the first node;
a second switch connected between the first node and the midpoint terminal of the second port;
a third switch connected between the midpoint terminal of the second port and the second node;
a fourth switch connected between the second node and the negative terminal of the second port.

In one aspect, the above resonant circuit is a LLC resonant circuit.

In one aspect, the DC-DC converter is provided for transferring power from the first DC port to the second DC port.

In one aspect, the control circuit is configured to control a first capacitor voltage over the first capacitor and a second capacitor voltage over the second capacitor individually.

In one aspect, the DC-DC converter includes a first sensor for measuring a parameter representative of a first capacitor voltage over the first capacitor and a second sensor for measuring a parameter representative of a second capacitor voltage over the second capacitor, wherein the first and second sensors are connected to the control circuit.

In one aspect, the control circuit is configured to supply power to the first capacitor during a first interval in which power is drawn from the first capacitor, and the control circuit is configured to supply power to the second capacitor during a second interval in which power is drawn from the second capacitor.

In one aspect, the control circuit during the first interval is configured to alternate between an initial charging state, in which the resonant circuit is charged by the DC source and a first charging state in which the first capacitor is charged by the resonant circuit, and the control circuit during the second interval is configured to alternate between the initial charging state and a second charging state in which the second capacitor is charged by the resonant circuit.

In one aspect, the second and third switches are on and the first and fourth switches are off during the initial charging state; the first and third switches are on and the second and fourth switches are off during the first charging state; and the second and fourth switches are on and the first and third switches are off during the second charging state.

In one aspect, a frequency for alternating between the first and second intervals is in the range 15 Hz-100 Hz; while a switching frequency for alternating between the initial, first and second charging states is in the range 50 kHz-500 kHz.

The present disclosure also relates to a power supply system, including:
a rectifier with an AC input port connectable to an AC power source and a DC output port connected to a DC bus;
an inverter with an AC output port connectable to an AC load and a DC port connected to the DC bus;
a DC-DC converter with a first DC port connectable to a DC source and a second DC port with a positive terminal, a midpoint terminal and a negative terminal connected to the DC bus;
a first capacitor connected between the positive terminal and the midpoint terminal;
a second capacitor connected between the midpoint terminal and the negative terminal;
wherein the DC-DC converter includes:
a first switching circuit including active switches connected between the first DC port, a first node and a second node;
a second switching circuit including active switches connected between the second DC port, a first node and a second node;
a resonant circuit connected between the nodes of the first switching circuit and the nodes of the second switching circuit;
a control circuit for controlling the power transfer from the first DC port to the second DC port by controlling the active switches of the first and second switching circuits;
wherein the second switching circuit includes:
a first switch connected between the positive terminal of the second port and the first node;
a second switch connected between the first node and the midpoint terminal of the second port;
a third switch connected between the midpoint terminal of the second port and the second node;
a fourth switch connected between the second node and the negative terminal of the second port.

The above aspects are also relevant for the DC-DC converter of the power supply system. The above power supply system is often referred to as an AC-UPS power supply system.

The present disclosure also relates to a method for controlling the above DC-DC converter, wherein the method includes the steps of:
measuring a parameter representative of a first capacitor voltage over the first capacitor;
measuring a parameter representative of a second capacitor voltage over the second capacitor;
controlling the first capacitor voltage over the first capacitor and the second capacitor voltage over the second capacitor individually.

In one aspect, the method includes the steps of:
supplying power to the first capacitor during a first interval in which power is drawn from the first capacitor;
supplying power to the second capacitor during a second interval in which power is drawn from the second capacitor.

In one aspect, the method includes the steps of:
during the first interval, alternating between an initial charging state, in which the resonant circuit is charged by the DC source and a first charging state in which the first capacitor is charged by the resonant circuit;

during the second interval, alternating between the initial charging state and a second charging state in which the second capacitor is charged by the resonant circuit.

In one aspect, the method includes the steps of:
controlling the second and third switches to be on and the first and fourth switches to be off during the initial charging state;
controlling the first and third switches to be on and the second and fourth switches to be off during the first charging state;
controlling the second and fourth switches to be on and the first and third switches to be off during the second charging state.

DETAILED DESCRIPTION OF DRAWINGS

Embodiments of the disclosure will now be described in detail with respect to the enclosed drawings, wherein:

FIG. 4b illustrates the sensors and their connection to the control circuit of the DC-DC converter in FIG. 4a;

Figure 10:
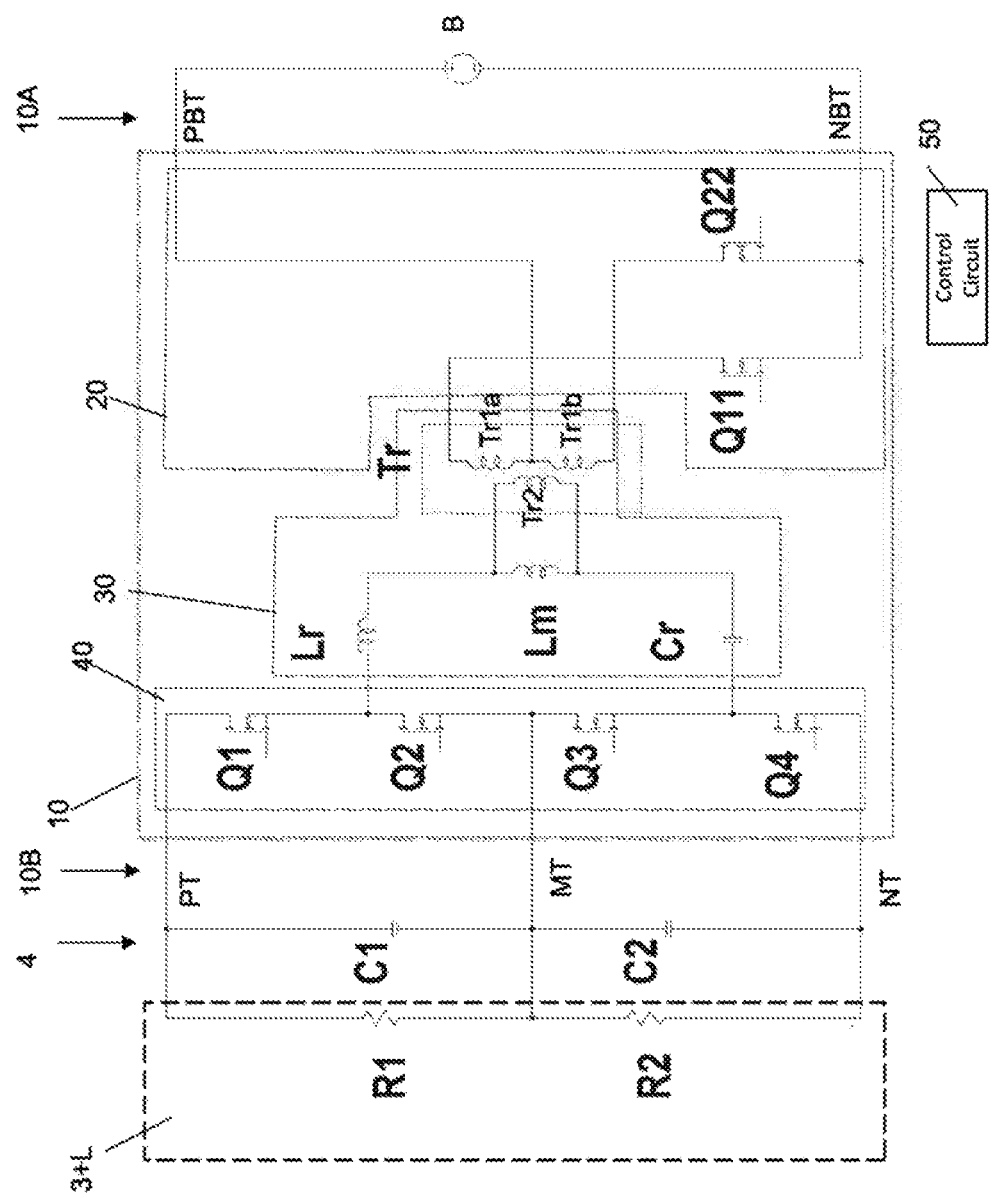

FIG. 7a-d illustrates power flow in the DC-DC converter during different switching states for symmetric load;

FIG. 8a-c illustrates power flow in the DC-DC converter during different switching states for asymmetric load (no R2);

FIG. 9a-c illustrates power flow in the DC-DC converter during different switching states for asymmetric load (no R1);

FIG. 10 illustrates an alternative topology of the first converter circuit of the DC-DC converter.

DESCRIPTION OF EMBODIMENTS

Definitions

The term "active switch" is used herein to describe an electric component with three terminals, where a first terminal (often referred to gate terminal or control terminal) receives a control signal from a control system and where the second and third terminals are either connected to each other or disconnected from each other based on the signal received by the first terminal. In power electronics, such an active switch can be a MOSFET, an IGBT, GaN FETs, SiC FETs etc. Accordingly, a diode is not considered to be an active switch.

A common method for forming the control signals to such an active switch is by using a microprocessor with digital output ports and analogue and/or digital input ports. The digital microprocessor output ports are connected to input terminals of isolated gate drive circuits, which again are connected to the power switches' control terminals, such as the abovementioned gate terminal. The parameters being controlled are sensed, such as input current, output voltages and relative phase difference between voltages and currents, by means of dedicated sense circuits and A/D converters to input ports of the microprocessor. The overall control tasks are performed by the use of dedicated software loaded to the microprocessor memory. The execution of the software is done in real time with as little delay as possible, and the converter can respond fast enough to keep the controlled parameters are within the limits specified in the requirement specification.

It should be mentioned that the control circuit is controlling the instance in time when the respective active switches are to be turned on and off, and for how long time the respective active switches are to be held in the respective on and off states. This is referred to as a switching pattern. The switching pattern can be different for the different switches. The microprocessor operates with a switching frequency for switching active switches on and off.

The term "positive terminal", "negative terminal" and/or "midpoint terminal" are used herein to separate the terminals of DC ports from each other. A two level DC port has two such terminals, a positive terminal and a negative terminal, while a three level DC port has a positive terminal, a negative terminal and a midpoint terminal. It should be noted that a skilled person will know that whether or not a DC voltage is positive, negative or zero is a matter of definition only. However, the positive terminal is defined to have a voltage which is positive with respect to the voltage of the midpoint terminal, while the negative terminal is defined to have a negative voltage with respect to the voltage of the midpoint terminal. The voltage of the midpoint terminal is often, by definition, 0V.

Figure 4A:
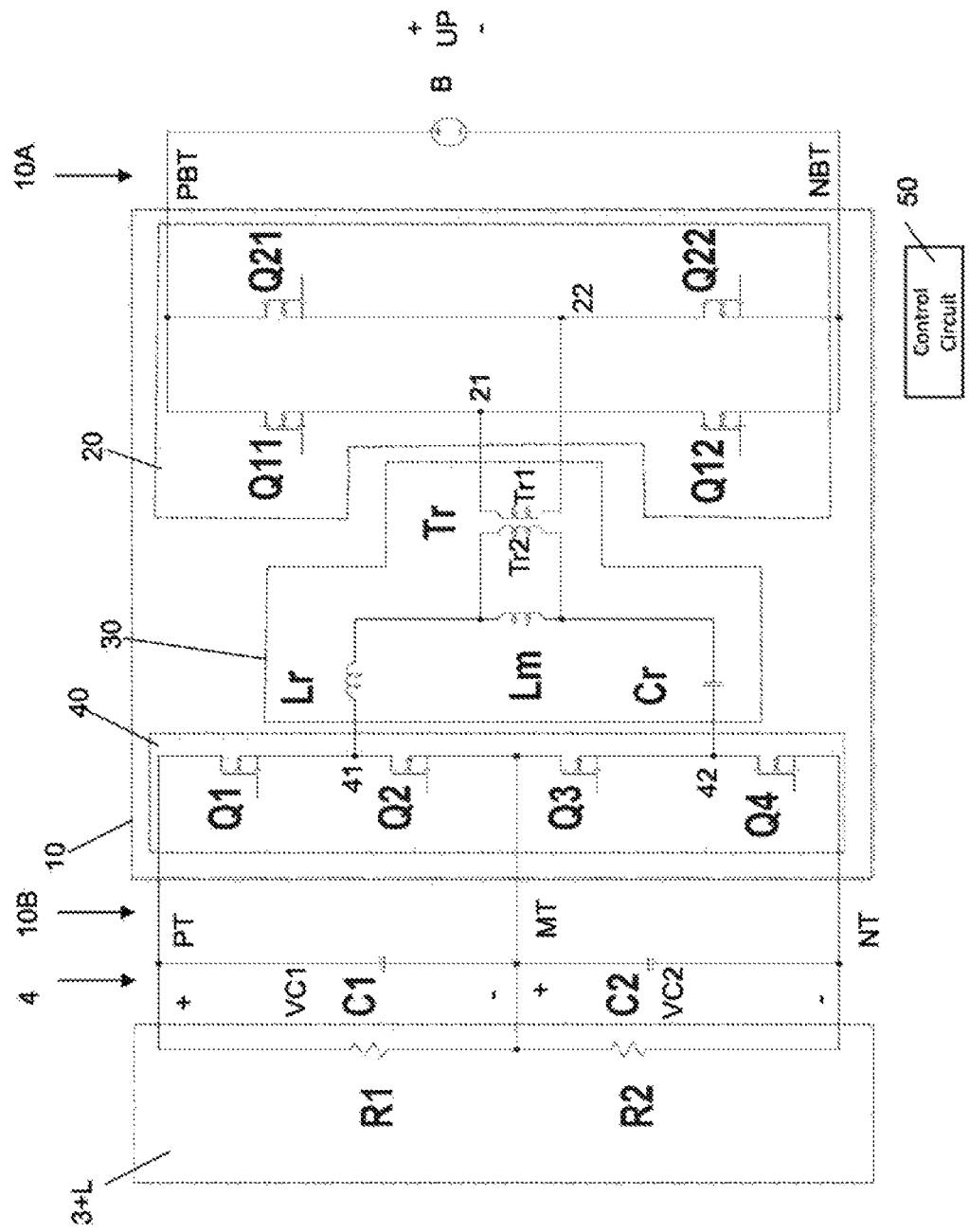
FIG. 4a illustrates a DC-DC converter according to a first embodiment.

First, it is referred to FIG. 4a, wherein a preferred embodiment of a DC-DC converter 10 is shown. In the description below, the DC-DC converter 10 is used in an AC UPS as in FIG. 1. It should be noted that the DC-DC converter 10 can be used in other applications as well.

The DC-DC converter includes a first DC port 10A and a second DC port 10B. The first DC port 10A has two terminals, here referred to as a positive battery terminal PBT and a negative battery terminal NTB. The first DC port 10A is shown connected to the battery B. It should be noted that the first DC port 10A can be connected to another type of DC energy source.

Figure 2B:
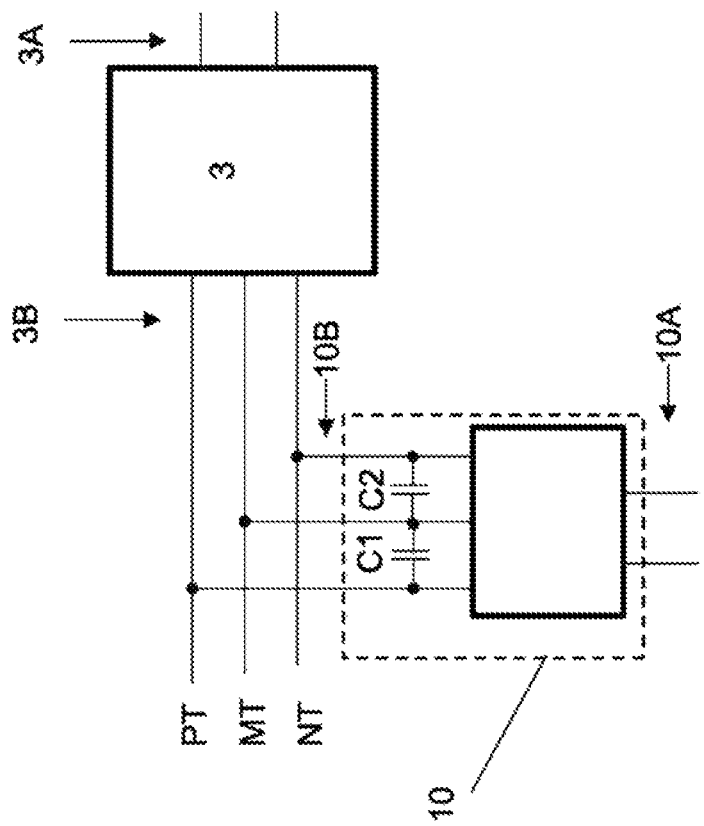
FIG. 2b illustrates the capacitors of the intermediate DC bus defined as a part of the DC-DC converter.

The second DC port 10B includes three terminals, a positive terminal PT, a midpoint terminal MT and a negative terminal NT. These terminals are connected to a DC bus 4. A first capacitor C1 is connected between the positive terminal PT and the midpoint terminal MT and a second capacitor C2 is connected between the midpoint terminal MT and the negative terminal NT. As described in the introduction above, it is a matter of definition only if these capacitors C1, C2 are considered as being a part of the DC-DC converter 10 (as shown in FIG. 2b) or if they are considered as being a part of the DC bus 4 or other converters connected to the DC bus 4.

The capacitors C1 and C2 are filter capacitors and provide also energy storage. Typical values are 100 uF-10000 uF, depending on the nominal power transfer through the converter. The capacitors C1 and C2 are normally electrolytic capacitors with a voltage rating >400 VDC. The capacitors filter the switching frequency which is normally in the range 10 kHz 500 kHz. The capacitors are also filtering the line or mains voltage frequency which is normally 50 Hz or 60 Hz. The reason for the line frequency filtering is because the +/−400V voltage may not deviate more than what is allowed by the voltage rating of the electrolytic capacitors themselves and the voltage rating of the power switches and other components in the power circuits forming the DC-DC converter 10, the inverter 3 and the rectifier 2. The capacitors C1 and C2 also help improving the quality of the DC-bus.

The DC-DC converter 10 includes a first switching circuit 20, a resonant circuit 30 and a second switching circuit 40, indicated by respective dashed lines in FIG. 4a.

The first switching circuit 20 includes active switches Q11, Q12, Q21, Q22 connected between the first DC port 10A, a first node 21 and a second node 22. The second switching circuit 40 includes active switches Q1, Q2, Q3, Q4 connected between the second DC port 10B, a first node 41 and a second node 42. The resonant circuit 30 is connected between the nodes 21, 22 of the first switching circuit 20 and the nodes 41, 42 of the second switching circuit 40. This will be described in further detail below.

The first switching circuit 20 is a full bridge switching circuit including four bi-directional switches Q11, Q12, Q21, Q22. The first switch Q11 is connected between the positive battery terminal PBT of the first DC port 10A and the first node 21. The second switch Q12 is connected between the first node 21 and the negative battery terminal NBT of the first DC port 10A. The third switch Q21 connected between the positive battery terminal PBT of the first DC port 10A and the second node 22. The fourth switch Q22 is connected between the second node 22 and the negative battery terminal NBT of the first DC port 10A.

The resonant circuit 30 is an LLC resonant circuit, including a transformer device Tr, a magnetizing inductor Lm, a resonant inductor Lr and a resonant capacitor Cr. The resonant inductor Lr, the magnetizing inductor Lm and the resonant capacitor Cr is connected in series between the first and second nodes 41, 42 of the second switching circuit 40. The transformer device Tr includes a primary winding Tr1 connected between the first and second nodes 21, 22 of the first switching circuit 20. The transformer device Tr includes a secondary winding Tr2 connected in parallel with the magnetizing inductor Lm.

Accordingly, the nodes 21, 22 of the first switching circuit 20 may be referred to as first and second primary side nodes 21, 22, as they are provided on the primary side of the transformer device. The nodes 41, 42 of the second switching circuit 40 may be referred to as first and second secondary side nodes 41, 42, as they are provided on the secondary side of the transformer device.

The second switching circuit 40 includes four bi-directional switches Q1, Q2, Q3, Q4. The first switch Q1 is connected between the positive terminal PT of the second DC port 10B and the first secondary node 41. The second switch Q2 is connected between the first secondary node 41 and the midpoint terminal MT of the second DC port 10B. The third switch Q3 is connected between the midpoint terminal MT of the second DC port 10B and the second secondary node 42. The fourth switch Q4 is connected between the second secondary node 42 and the negative terminal NT of the second DC port 10B.

In FIG. 4a, it is also shown two resistors R1 and R2 within a dashed box "3+L". These resistors represent the total load as seen from the terminals PT, MT and NT of the DC-DC converter 10. In the present example, these resistors R1, R2 represents the sum of the load L connected to the inverter 3 and the inverter 3 itself (hence the expression "3+L"). The first resistor R1 is connected between the positive terminal PT and the midpoint terminal MT, while the second resistor R2 is connected between the midpoint terminal MT and the negative terminal NT. It should be noted that these resistors R1 and R2 in many practical applications will be varying over time (resistor R1>resistor R2 or vice versa), in other applications they might be equal to each other or substantially equal to each other (resistor R1=resistor R2).

When power is flowing from the battery B to the resistors R1, R2, the battery terminals PBT and NBT can be considered as input terminals of the first switching circuit 20 while nodes 21, 22 can be considered as output terminals of the first switching circuit 20. The nodes 21, 22 can be considered as input terminals of the resonant circuit 30 while the nodes 41, 42 can be considered as output terminals of the resonant circuit 30. Finally, the nodes 41, 42 can be considered as input terminals of the second switching circuit 40, while the positive terminal PT, the midpoint terminal MT and the negative terminal NT can be considered as output terminals of the second switching circuit 40. Hence, the nodes 21, 22, 41, 42 are considered to represent internal interfaces between the circuits 20, 30, 40, while the terminals PBT, NBT of the first DC port 10A and the terminals PT, MT, NT of the second DC port 10B are external, i.e. accessible on the outside of the DC-DC converter 10.

As indicated in FIG. 4a, a first capacitor voltage VC1 is indicated over the first capacitor C1 (also representing the voltage over the first resistor R1) and a second capacitor voltage VC2 is indicated over the second capacitor C2 (also representing the voltage over the second resistor R2). The voltage of the first DC port 10A is referred to as a primary side voltage UP.

The transformer ratio between the primary and secondary winding Tr1, Tr2 is determined by the relation between the desired capacitor voltage VC1, VC2 over capacitors C1 and C2 and the primary side voltage UP. As an example, when a 48V battery B is connected to the first DC port 10A and the desired output voltage is 360V over C1 and 360V over C2, a suitable transformer ratio may approximately be 2 to 7.5.

The DC-DC converter also includes a control circuit 50 for controlling the power transfer from the first DC port 10A to the second DC port 10B by controlling the active switches of the first and second switching circuits 20, 40. The control circuit 50 includes all circuitry and software necessary to control the switches of the DC-DC converter 10. It should be noted that the same control circuit 50 can also include all circuitry and software necessary to control the switches of the rectifier 2 and inverter 3. Hence, the control circuit 50 may include the above-mentioned microprocessor, gate driver circuits and possibly also analog to digital converters for converting analog sensor signals to digital signals inputted to the microprocessor.

Figure 4B:
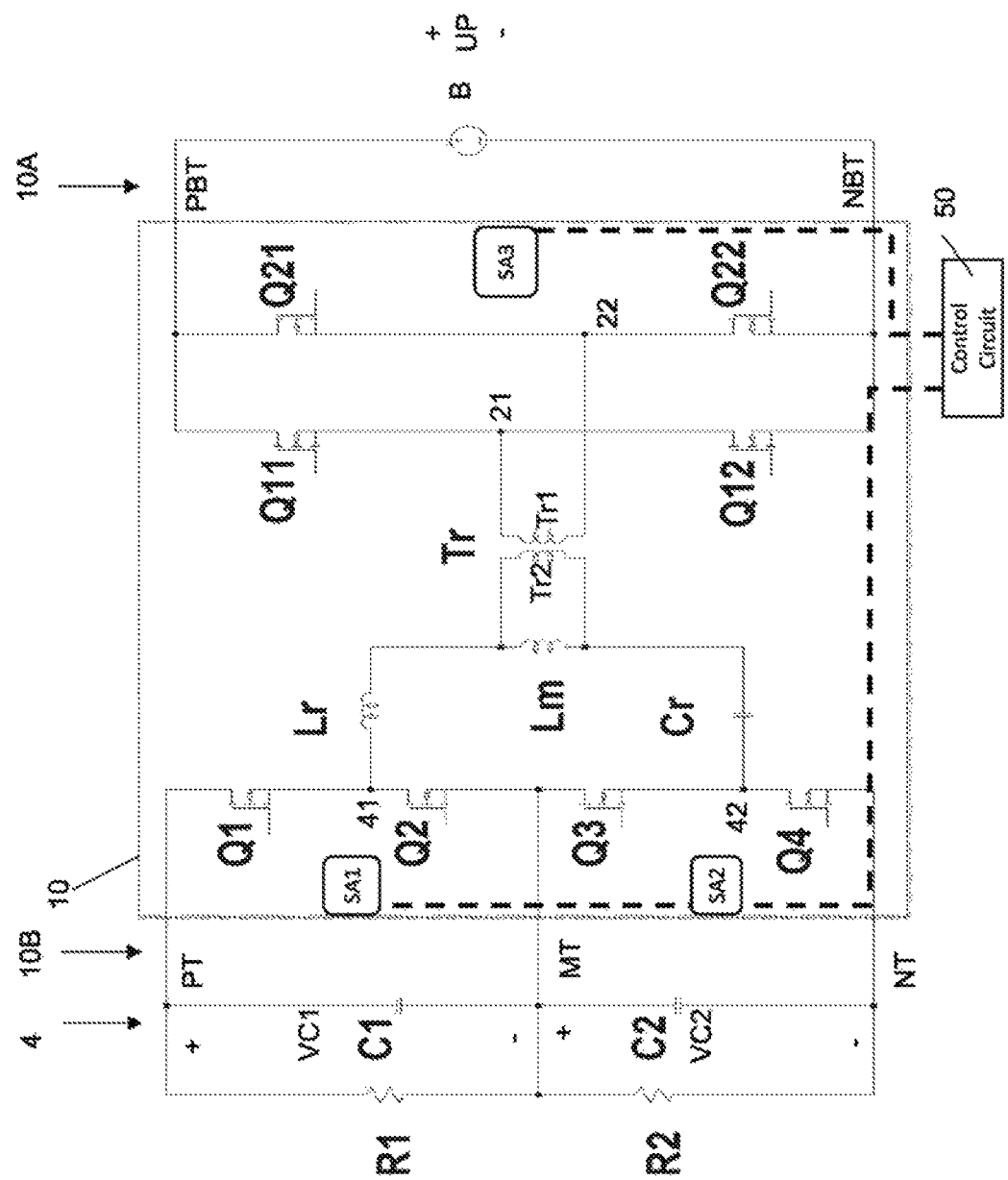

It is now referred to FIG. 4b. FIG. 4b substantially corresponds to FIG. 4a, but in FIG. 4b, sensors SA1, SA2, SA3 are shown connected to the control circuit 50 via dashed lines. The control circuit 50 together with sensors SA1, SA2, SA3 are forming a control system.

The sensor SA1 is measuring a parameter representative of the voltage VC1 over the first capacitor C1, the sensor SA2 is measuring a parameter representative of the voltage VC2 over the second capacitor C2, the sensor SA3 is measuring a parameter representative of the voltage UP over the first DC port 10A. It should be noted that a reference voltage source and a corresponding sensing circuit would be needed in the embodiment, and the control circuit may form a regulator with a closed feedback control loop. It is normal procedure to perform a calibration of these sensing circuits in order to achieve good enough precision of the controlled quantities.

Below, the operation of the DC-DC converter 10 will be described in detail. The DC-DC converter 10 described as a part of an AC-UPS 1, i.e. connected to a rectifier 2 and an inverter 3 via the DC bus 4. The voltage of the DC bus 4 is +/−400V, the battery voltage is 48V as in FIG. 1. The rectifier 2 is connected to a three phase 400 Vac voltage and the inverter 3 is supplying a load with single phase 230 V power.

The rectifier 2 and the inverter 3 are considered known, and will not be described herein in detail.

It should be noted that the DC-DC converter 10 described above can be controlled to transfer power from the DC bus 4 to the battery B, i.e. to recharge the battery B. The sensor SA3 is then used by the control circuit 50 to measure the re-charging voltage over the battery B. Alternatively, it is possible to provide a separate DC-DC converter (not shown) between the DC bus 4 and the battery B to recharge the battery. In yet an alternative, it is possible to recharge the battery B by means of a separate DC source (not shown). As mentioned above, another type of DC source may be connected to the input port 10A, and hence, reverse power flow through the DC-DC converter 10 is not an essential feature of the present disclosure.

Hence, the focus of the description below is to describe the operation of the DC-DC converter 10 when power is transferred from the DC source (for example the battery B) to the DC bus and further through the inverter 3 to the AC load L.

The AC-load is supplied with energy taken from the battery during a mains failure. The AC output power port 3A can provide a regulated sinusoidal AC voltage to the load L. If the load is resistive, it will draw a current, in FIG. 1 indicated as current I3, in phase with the AC-voltage, which is alternating between positive and negative. In other words, when the AC-voltage is positive during the first half period, there will be positive current, and when the AC-voltage is negative during the next half period, there will be a negative current supplying power to the AC-load. So the load, if resistive, is taking equal amount of power during the positive half period as during the negative half period. The frequency of the power flow is therefore always twice the frequency of the AC-voltage frequency.

The frequency of the current I3 supplied to the load is hereinafter referred to as the line frequency.

Figure 1:
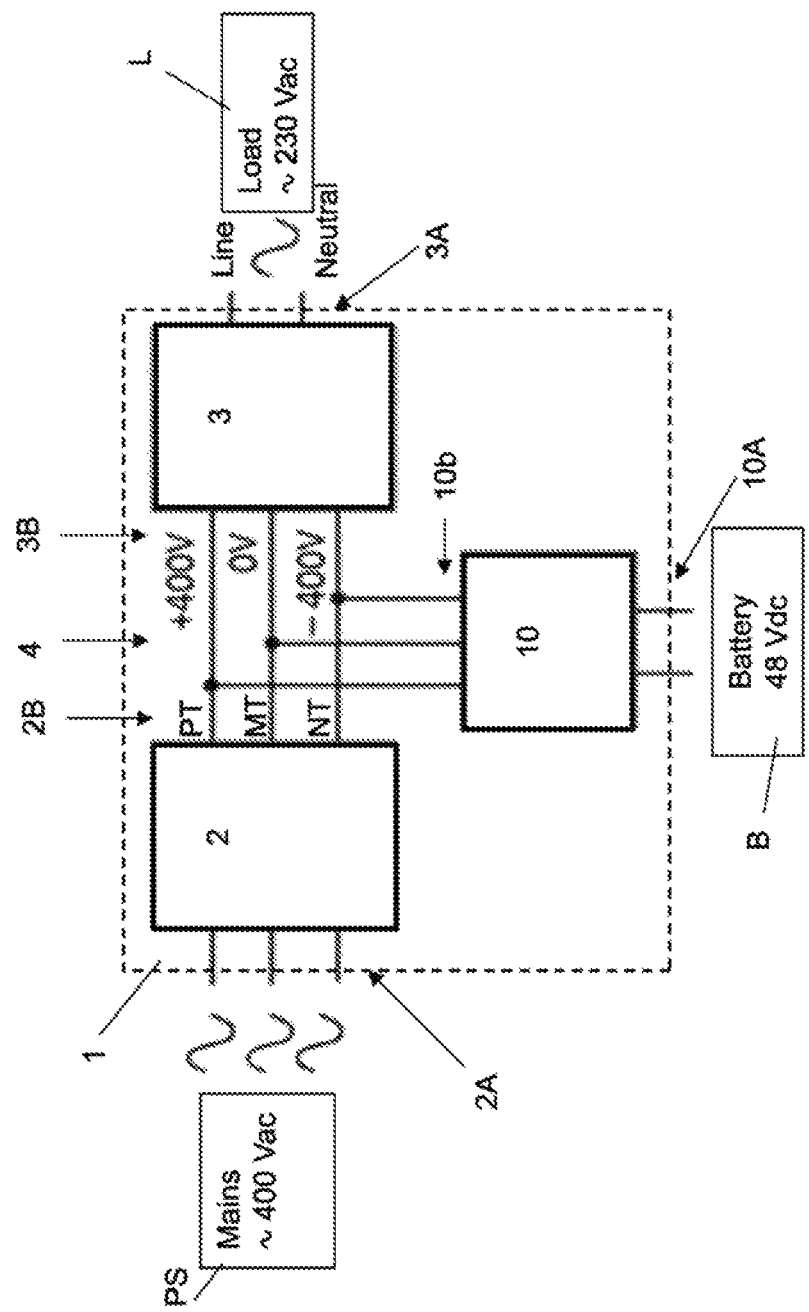
FIG. 1 illustrates a prior art AC-UPS.

The AC-load is normally connected between a line terminal and a neutral terminal (FIG. 1). The neutral is typically connected to the mid-point terminal MT of the DC bus 4. Positive current is here defined as current sourced from the positive terminal PT of the intermediate DC supply to the Line terminal of the AC-load and returned at a common neutral connection for the AC-load and the inverter. Negative current is here defined as current sourced from the common Neutral connection to the Line terminal of the AC-load and returned to the negative terminal of the intermediate DC supply.

The three level inverter 3 takes positive current from the positive terminal PT and returns the current to the midpoint terminal MT during the positive half period.

The three level inverter 3 takes negative current from the midpoint terminal MT and returns the current to the negative terminal NT during the negative half period.

From this description of the 3-voltage levels and inverter function it is clear that the positive terminal, to which capacitor C1 is connected will be the source for positive current during the positive half cycle. It is also clear that the negative terminal to which capacitor C2 is connected will sink the current through the AC-load during the negative half cycle.

The positive and negative terminals will separately support the entire current and power demand from the AC-load, and the entire current and power demand from the AC-load is supported from the positive terminal during the first half of the AC output voltage frequency period, and supported from the negative terminal during the second half of the AC output voltage frequency period.

During the development of the present disclosure, it was found desirable to have a DC-DC converter which could be controlled to be synchronized to be in phase with the AC-load frequency I3. Moreover, it was found desirable that the two capacitors C1 and C2 are charged independently and in the same rate as the capacitors are discharged by the inverter supplying current to the AC-load.

In other words, the DC-DC converter 10 can take energy from the battery on its input and separately charge any of two capacitors, C1 and C2, in the same rate as the capacitors are discharged by the inverter supplying current to the AC-load.

This means that the DC-DC converter 10 will charge the two capacitors in the intermediate DC-bus, and the first capacitor C1, which is connected to the positive terminal of the intermediate DC-bus, will be charged during the first half of the AC-load frequency period, and the second capacitor C2, which is connected to the negative terminal of the intermediate DC-bus, will be charged during the second half of the AC-load frequency period.

The need for charging of the two capacitors C1, C2 will be based on the voltages VC1 and VC2 as measured by the sensors SA1, SA2. When power is drawn from one of the capacitors C1, C2 by the inverter 3, this is detected as a reduction in the voltage VC1, VC2 over that capacitor, and the control circuit 50 will draw power from the battery B and charge that capacitor again.

Figure 2A:
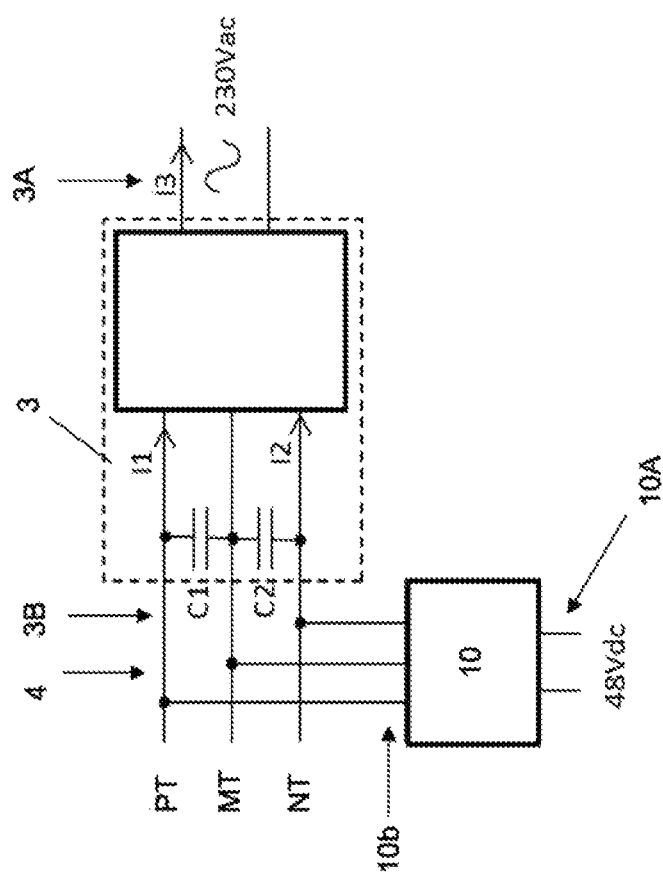
FIG. 2a illustrates the capacitors of the intermediate DC bus defined as a part of the DC-AC converter.
Figure 3:
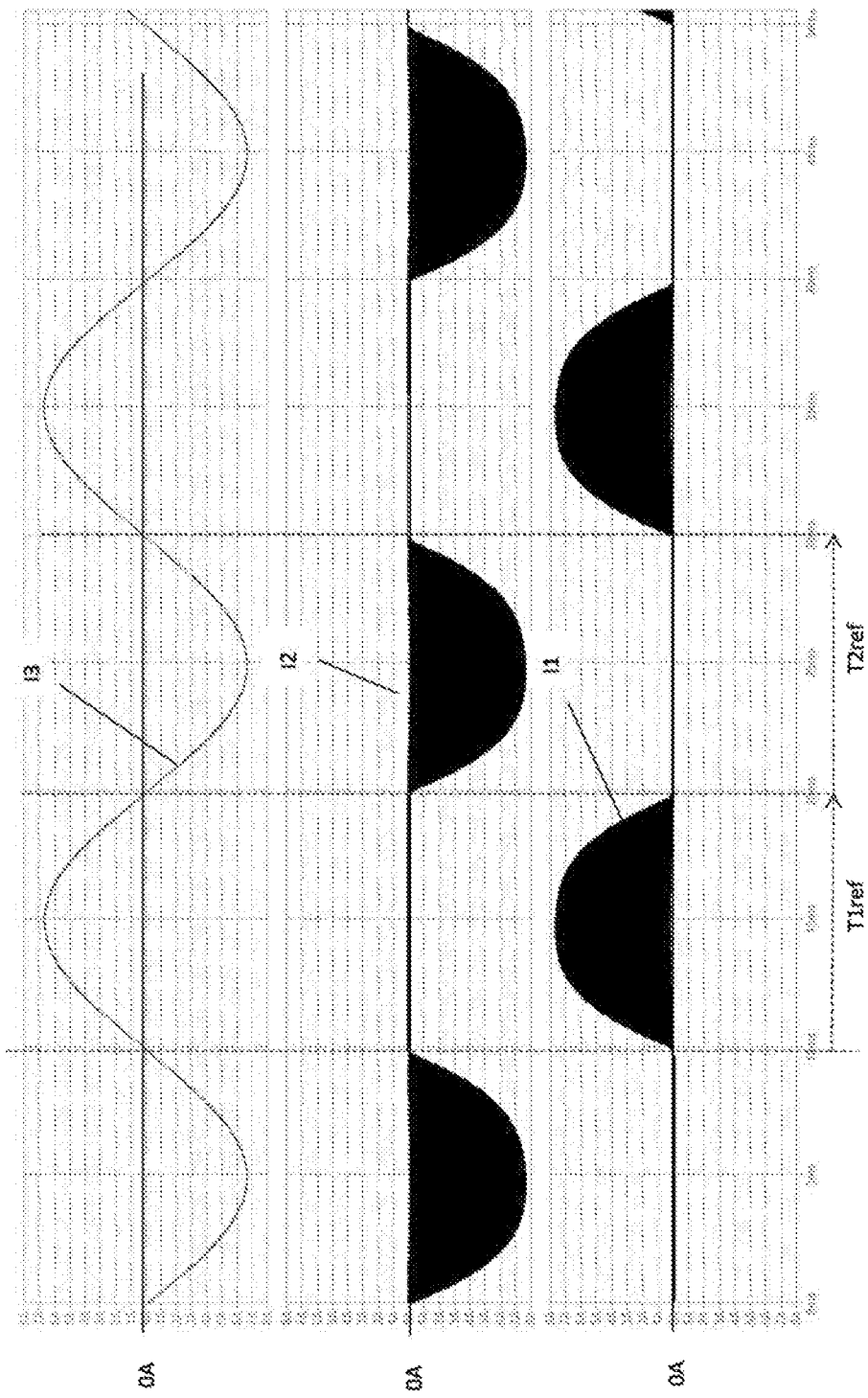
FIG. 3 illustrates the currents of the DC-DC converter and DC-AC converter when power is transferred from the battery to the load.

In FIG. 3, the AC load current I3 is indicated with half periods T1ref and T2ref. The discharging current of the first capacitor C1 is in FIG. 2a indicated as current I1. The discharging current of the second capacitor C2 is in FIG. 2a indicated as current I2. These currents are also shown for clarity in FIG. 3.

During the first interval T1ref, the load current I3 and the load voltage is positive. Here, power is drawn from the first capacitor C1, and this is sensed as a reduced voltage over the first capacitor C1. To compensate for this, the control circuit 50 will draw power from the battery B and charge the capacitor C1 again, as shown by the current I1 in FIG. 3. In the first interval T1ref, no power is drawn from the second capacitor C2, as described above, and hence the current I2 is zero in the first interval T1ref.

During the second interval T2 ref, the load current I3 and the load voltage is negative. Here, power is drawn from the second capacitor C2, and this is sensed as a reduced voltage over the second capacitor C2. To compensate for this, the control circuit 50 will draw power from the battery B and charge the capacitor C2 again, as shown by the current I2 in FIG. 3. In the second interval T2ref, no power is drawn from the first capacitor C1, as described above, and hence the current I1 is zero in the second interval T2ref.

Accordingly, if the charging current and discharging current are approximately the same, there is less need for filtering the line frequency and thus smaller capacitor values for the capacitors C1 and C2 can be chosen. Another advantage is that there could be no need for having two separate, two terminal input, two terminal output DC-DC converters, one for each capacitor C1, C2, which have to be designed to be able to supply the full AC-load power. Instead, with this two terminal input, three terminal output resonant LLC converter, it is now possible to use only one resonant tank, and one single input power stage.

Figure 5A:
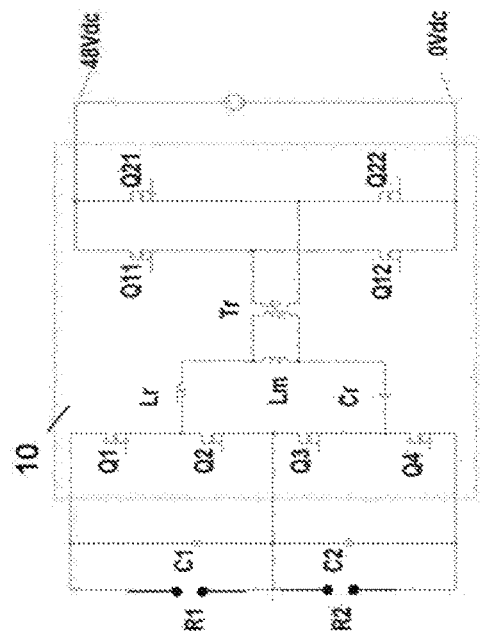
FIG. 5a illustrates the DC-DC converter of FIG. 4a, with a first asymmetric load.
Figure 5C:
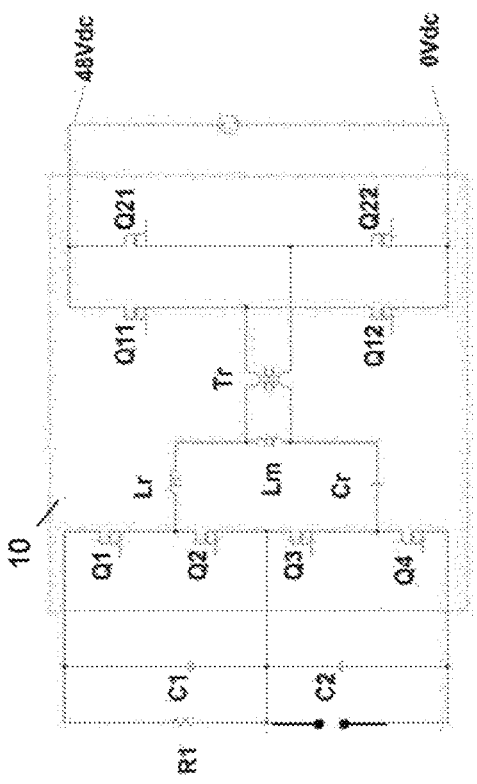
FIG. 5c illustrates the DC-DC converter of FIG. 4a, with no load.
Figure 5B:
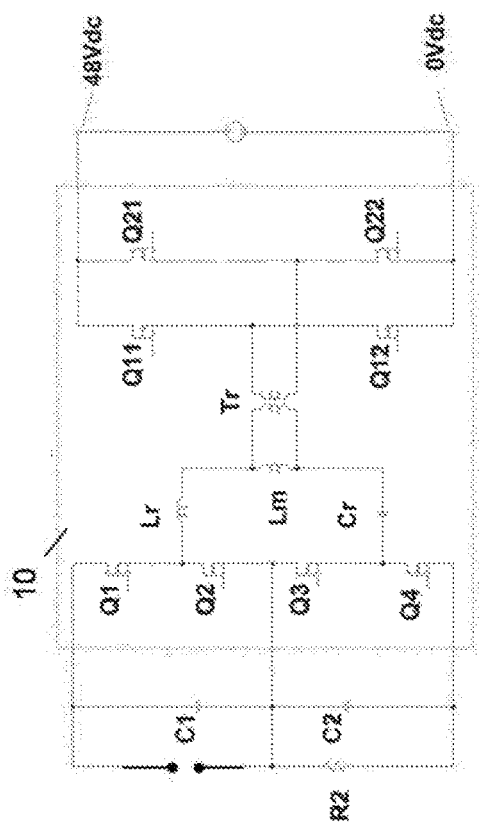
FIG. 5b illustrates the DC-DC converter of FIG. 4a, with a second asymmetric load.

In FIGS. 4a and 4b, the first resistor R1 is substantially equal to the second resistor R2, and corresponds to a typical mode of operation where the load is symmetrical and is drawing power from both capacitors C1 and C2. This would be the case when there is a DC-load connected to the 3 L DC-bus. Some other modes of operation are shown in FIG. 5a, 5b, 5c, where:

In FIG. 5a, the load is asymmetric, as the first resistor R1 is present and no second resistor R2 is present;

In FIG. 5b, the load is asymmetric, as the second resistor R2 is present and no first resistor R1 is present;

In FIG. 5c, the first and second resistors are not present, i.e. there is no load. This is a special case of a symmetric load.

Figure 6A:
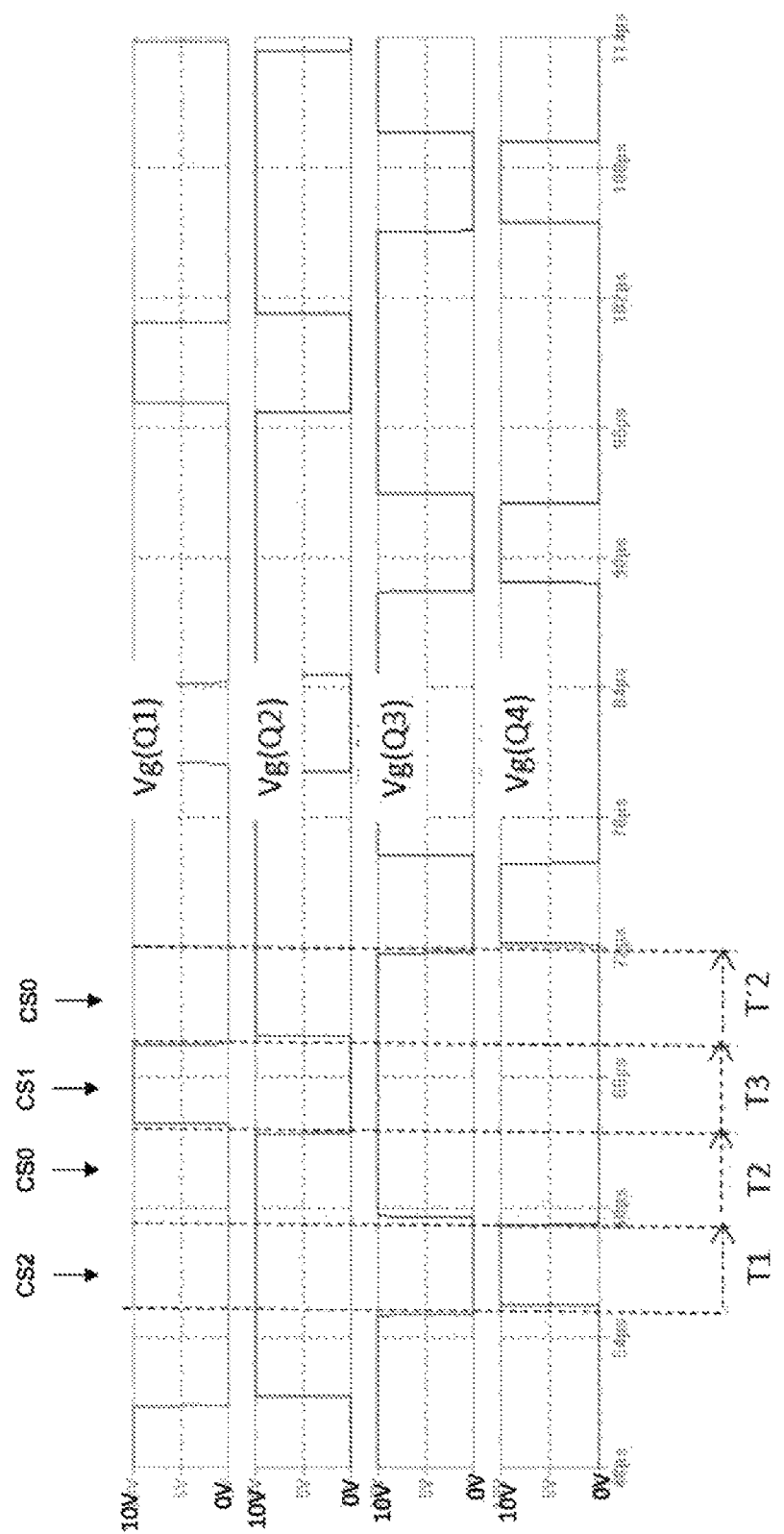
FIG. 6a illustrates how the switches of the DC-DC converter in FIG. 4a and FIG. 4b is controlled.
Figure 6B:
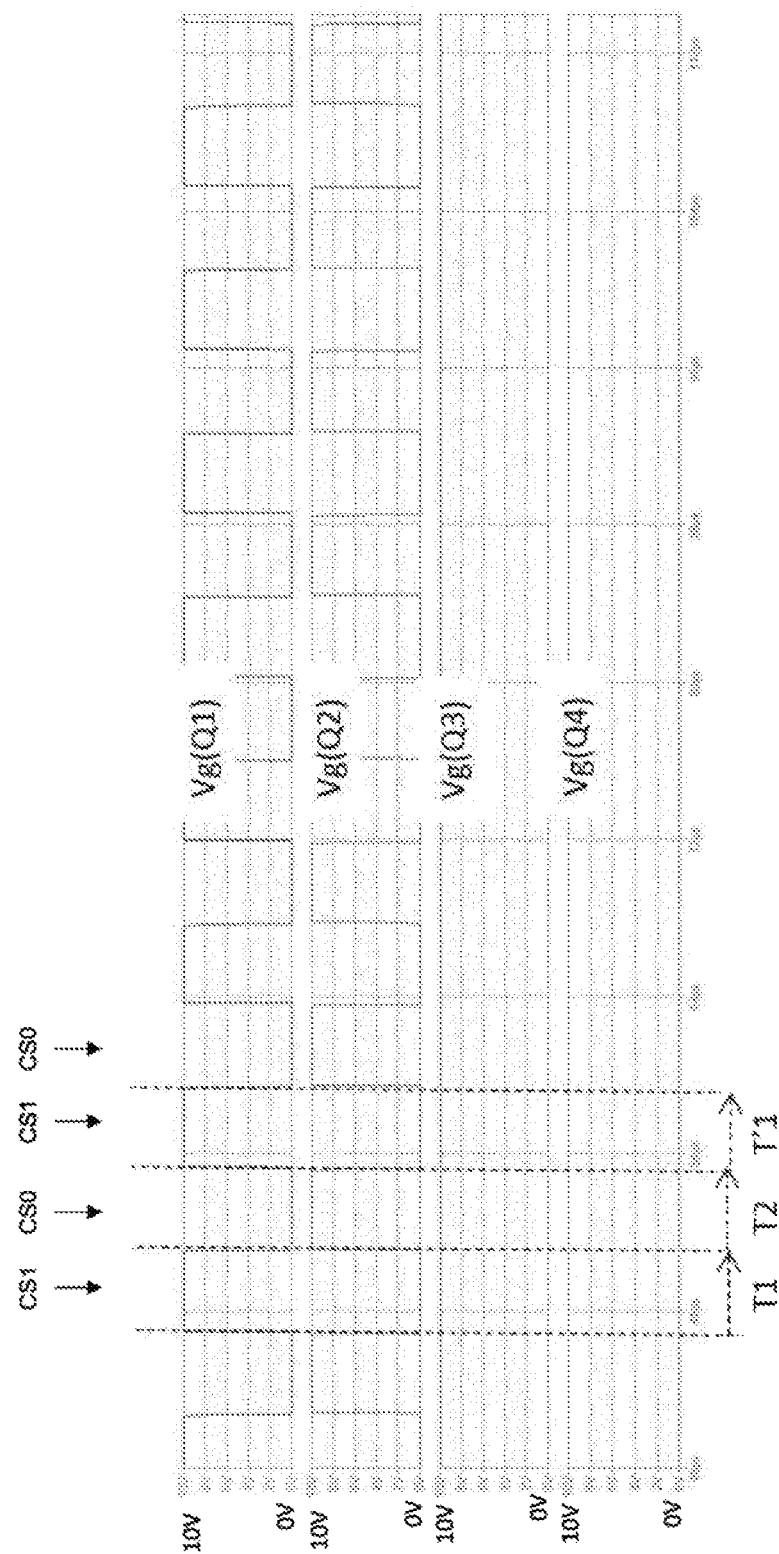
FIG. 6b illustrates how the switches of the DC-DC converter in FIG. 5a is controlled.
Figure 6C:
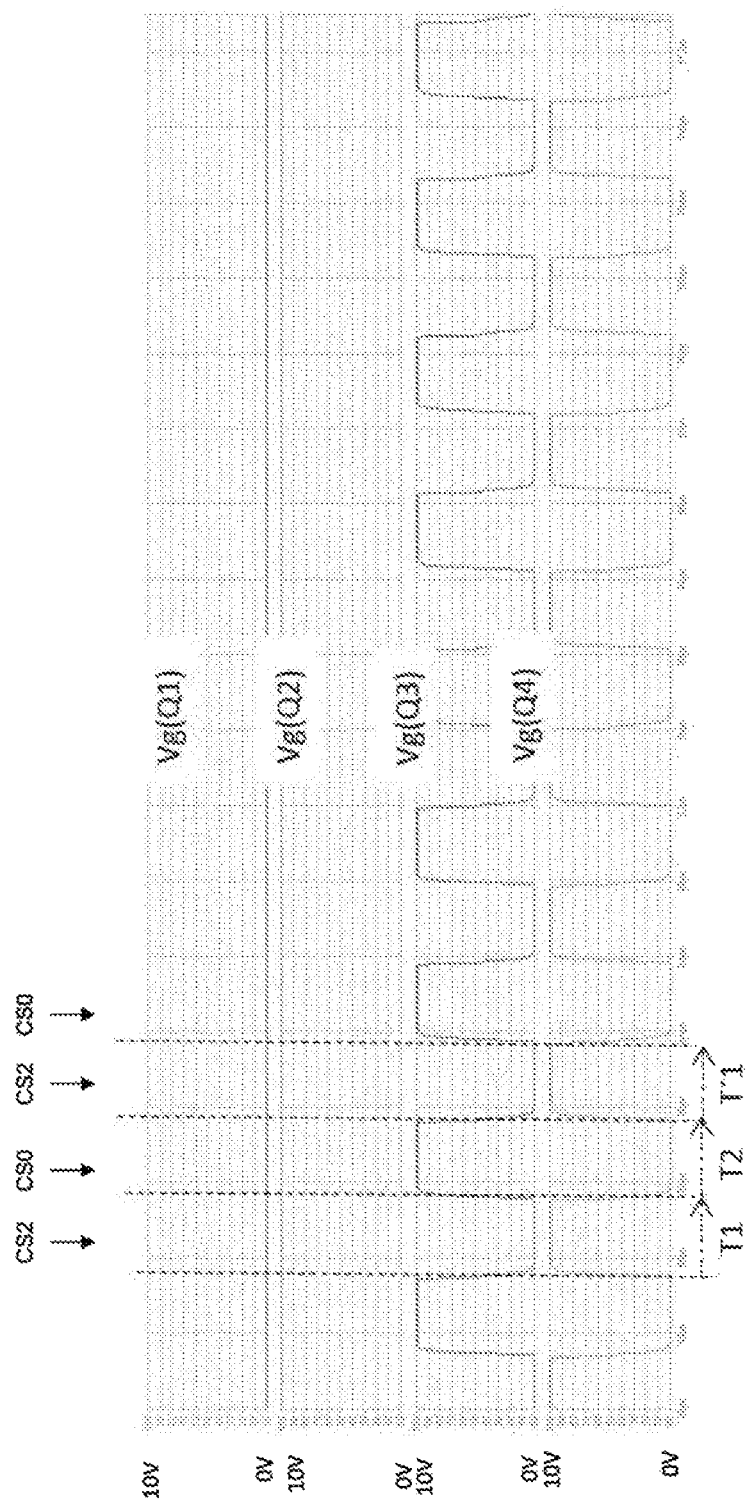
FIG. 6c illustrates how the switches of the DC-DC converter in FIG. 5b is controlled.

In FIG. 6a-c, the gate voltages Vg for each of the switches Q1, Q2, Q3, Q4 are shown. These gate voltages Vg are controlled by the control circuit 50. A gate voltage of 0V will turn the respective switches OFF and a gate voltage of 10V will turn the respective switches ON.

Example 1: Asymmetric Resistive Load
(Corresponding to FIG. 5a Above)

It is now referred to FIG. 6b and FIG. 8a-c. This corresponds to the first interval T1ref described above, where power is only drawn from the first capacitor C1.

In a first time interval T1 (FIG. 8a), the switches Q1 and Q3 are turned on, while switches Q2 and Q4 are turned off. Here, the resonant circuit 30 is supplying power to the first capacitor C1 and hence also to the first resistor R1. This state is referred to as a first charging state CS1, as it is the first capacitor C1 that is charged.

In the second time interval T2 (FIG. 8b), the switches Q2 and Q3 are turned ON, while switches Q1 and Q4 are turned OFF. Here, the resonant circuit 30 is charged by the battery B. This state is referred to as the initial charging state CS0, as the resonant circuit 30 should be initially charged before it is possible to charge the capacitors C1, C2.

In a subsequent time interval T'1 (FIG. 8c), the switches are in the same state as in the first time interval T1 again.

According to the above, the switching pattern will be the following sequence of states CS0-CS1-CS0-CS1 etc.

Example 2: Asymmetric Resistive Load
(Corresponding to FIG. 5b Above)

It is now referred to FIG. 6c and FIG. 9a-c. This corresponds to the second interval T2ref described above, where power is only drawn from the second capacitor C2.

In the first time interval T1 (FIG. 9a), the switches Q2 and Q4 are turned ON, while switches Q1, Q3 are turned OFF. Here, the resonant circuit 30 is supplying power to the second capacitor C2 and hence also to the second resistor R2. This state is hereinafter referred to as a second charging state CS2, as it is the second capacitor C2 that is charged.

In the second time interval T2 (FIG. 9b), the switches Q2 and Q3 are turned ON, while switches Q1 and Q4 are turned OFF. Here, the resonant circuit 30 is charged by the battery B. This corresponds to the initial charging state CS0 described above.

In a subsequent time interval T'1 (FIG. 9c), the switches are in the same state as in the first time interval T1 again, and the resonant circuit 30 is charged by the battery B.

According to the above, the switching pattern will be the following sequence of states CS0-CS2-CS0-CS2 etc.

Example 3: Symmetric Resistive Load
(Corresponding to FIGS. 4a and 4b Above)

It is now referred to FIG. 6a and FIG. 7a-d. It should be noted that in this example, the resistors R1 and R2 are drawing the same amount of power at the same time. One example of such a load can be a DC-DC converter for drawing power from the DC bus 4 and supplying it to a DC load in the form of a data center. In such a situation, the voltage VC1 will vary identical to VC2 and hence the switching pattern will charge the first capacitor and second capacity alternatingly.

In the first time interval T1 (FIG. 7a), the switches Q2 and Q4 are turned ON, while switches Q1, Q3 are turned OFF. Here, the resonant circuit 30 is supplying power to the second capacitor C2 and hence also to the second resistor R2. This corresponds to the second charging state CS2 described above.

In the second time interval or state T2 (FIG. 7b), the switches Q2 and Q3 are turned ON, while switches Q1 and Q4 are turned OFF. Here, the resonant circuit 30 is charged by the battery B. This corresponds to the initial charging state CS0 described above.

In the third time interval or state T3 (FIG. 7c), the switches Q1 and Q3 are turned ON, while switches Q2 and Q4 are turned OFF. Here, the resonant circuit 30 is supplying power to the first capacitor C1 and hence also to the first resistor R1. This corresponds to the first charging state CS1 described above.

In a subsequent time interval T'2 (FIG. 7d), the switches are in the same state as in the second time interval T2 again, and the resonant circuit 30 is charged by the battery B.

According to the above, the switching pattern will be the following sequence of states CS0-CS1-CS0-CS2-CS0-CS1-CS0-CS2 etc.

In the special case of no load as shown in FIG. 5c, this same switching pattern can be used.

It is now referred back to FIG. 3 again. As shown here, the capacitor currents I1 and I2 are shown as solid black area. These capacitor currents I1, I2 are in fact built up by a large number of current pulses created by the switches of the DC-DC converter 10. The frequency of the AC load current I2 is typically in in the range 15 Hz-100 Hz. In FIG. 3, one period is 20 ms, i.e. a frequency of 50 Hz, while the switching frequency of the capacitor currents I1, I2 is in the range 50 kHz-500 kHz. In FIG. 6a-6c, one period is 8.33 µs, i.e. a switching frequency of 120 kHz.

In practical applications, the voltages VC1, VC2 over the capacitors C1 and C2 will be measured in real time or in near real time, where the capacitor voltages will vary slightly based on variations in the AC load etc. However, only the first capacitor C1 will be charged during the positive half period T1ref and only the second capacitor C2 will be charged during the negative half period T2ref. Of course, if no power is drawn from one or both of the capacitors, no charging will occur during the respective half periods.

One advantage with the above DC-DC converter 10 and an AC-UPS 1 with such a DC-DC converter 10 is that the first and second capacitors C1, C2 can be charged individually, i.e. if more power is drawn from the first capacitor C1 than from the second capacitor C2, then the control system 50 will be able to use the switching pattern of the first example above, to control the power flow from the battery to that capacitor C1. If the situation changes, and more power is drawn from the second capacitor C2 than from the first capacitor C1, then the control system 50 will be able to use the switching pattern of the second example above, to control the power flow from the battery to that capacitor C2.

Alternative Embodiments

An alternative embodiment of the DC-DC converter 10 is shown in FIG. 10. Here, the first switching circuit 20 includes two switches Q11, Q22. In addition, the transformer Tr of the resonant circuit 30 includes a first primary winding Tr1*a* and a second primary winding Tr1*b*. The first switch Q11 is connected in series with the first primary winding Tr1*a* between the positive and negative battery terminals NBT, PBT and the second switch Q22 is connected in series with the second primary winding Tr1*b* between the positive and negative battery terminals NBT, PBT.

Above, we have described the load R1 and R2 as seen from the DC-DC converter 10 to be resistive. The same description is valid for inductive or capacitive load of the inverter's output port.

This new DC-DC converter can also be used as a DC-UPS. The 3-level DC-bus can supply a +/−400 DC bus for high efficiency distribution of electrical energy in a building, for example a building containing a datacenter.

The DC-bus can also be configured to supply +/−400V for distributing electrical energy.

The 3-level DC-bus can also be connected to PV-panel via the DC-DC converter 10 for harvesting solar energy.

What is claimed is:

1. A DC-DC converter (10), comprising:
   a first DC port (10A) connectable to a DC source (B);
   a second DC port (10B) with a positive terminal (PT), a midpoint terminal (MT) and a negative terminal (NT) connectable to a DC bus (4);
   a first capacitor (C1) connected between the positive terminal (PT) and the midpoint terminal (MT);
   a second capacitor (C2) connected between the midpoint terminal (MT) and the negative terminal (NT);
   a first switching circuit (20) comprising active switches connected between the first DC port (10A), a first node (21) and a second node (22);
   a second switching circuit (40) comprising active switches connected between the second DC port (10B), a first node (41) and a second node (42);
   a resonant circuit (30) connected between the nodes (21, 22) of the first switching circuit (20) and the nodes (41, 42) of the second switching circuit (40); and
   a control circuit (50) for controlling power transfer from the first DC port (10A) to the second DC port (10B) by controlling the active switches of the first and second switching circuits (20, 40),
   wherein the second switching circuit (40) comprises:
   a first switch (Q1) connected between the positive terminal (PT) of the second port (10B) and the first node (41);
   a second switch (Q2) connected between the first node (41) and the midpoint terminal (MT) of the second port (10B);
   a third switch (Q3) connected between the midpoint terminal (MT) of the second port (10B) and the second node (42); and
   a fourth switch (Q4) connected between the second node (42) and the negative terminal (NT) of the second port (10B);
   wherein the control circuit (50) during a first interval (T1ref) is configured to alternate between an initial charging state (CS0), in which the resonant circuit (30) is charged by the DC source (B) and a first charging state (CS1) in which the first capacitor (C1) is charged by the resonant circuit (30), and the control circuit (50) during a second interval (T2ref) is configured to alternate between the initial charging state (CS0) and a second charging state (CS2) in which the second capacitor (C2) is charged by the resonant circuit (30).

2. The DC-DC converter (10) according to claim 1, wherein the control circuit (50) is configured to control a first capacitor voltage (VC1) over the first capacitor (C1) and a second capacitor voltage (VC2) over the second capacitor (C2) individually.

3. The DC-DC converter (10) according to claim 1, wherein the DC-DC converter (10) comprises a first sensor (SA1) for measuring a parameter representative of a first capacitor voltage (VC1) over the first capacitor (C1) and a second sensor (SA2) for measuring a parameter representative of a second capacitor voltage (VC2) over the second capacitor (C2), wherein the first and second sensors (SA1, SA2) are connected to the control circuit (50).

4. The DC-DC converter (10) according to claim 3, wherein
   a frequency for alternating between the first and second intervals (T1ref, T2ref) is in the range 15 Hz 100 Hz;
   a switching frequency for alternating between the initial, first and second charging states (CS0, CS1, CS2) is in the range 50 kHz 500 kHz.

5. The DC-DC converter (10) according to claim 1, wherein the control circuit (50) is configured to supply power to the first capacitor (C1) during the first interval (T1ref) in which power is drawn from the first capacitor (C1), and wherein the control circuit (50) is configured to supply power to the second capacitor (C2) during the second interval (T2ref) in which power is drawn from the second capacitor (C2).

6. The DC-DC converter (10) according to claim 1, wherein
   the second and third switches (Q2, Q3) are on and the first and fourth switches (Q1, Q4) are off during the initial charging state (CS0);
   the first and third switches (Q1, Q3) are on and the second and fourth switches (Q2, Q4) are off during the first charging state (CS1);
   the second and fourth switches (Q2, Q4) are on and the first and third switches (Q1, Q3) are off during the second charging state (CS2).

7. A method for controlling the DC-DC converter (10) according to claim 1, comprising the steps of:
   measuring a parameter representative of a first capacitor voltage (VC1) over the first capacitor (C1);
   measuring a parameter representative of a second capacitor voltage (VC2) over the second capacitor (C2);
   controlling the first capacitor voltage (VC1) over the first capacitor (C1) and the second capacitor voltage (VC2) over the second capacitor (C2) individually.

8. The method according to claim 7, comprising the steps of:
   supplying power to the first capacitor (C1) during the first interval (T1ref) in which power is drawn from the first capacitor (C1);

supplying power to the second capacitor (C2) during the second interval (T2ref) in which power is drawn from the second capacitor (C2).

9. A power supply system (1), comprising:
a rectifier (2) with an AC input port (2A) connectable to an AC power source (PS) and a DC output port (2B) connected to a DC bus (4);
an inverter (3) with an AC output port (3A) connectable to an AC load (L) and a DC port (3B) connected to the DC bus (4);
a DC-DC converter (10) with a first DC port (10A) connectable to a DC source (B) and a second DC port (10B) with a positive terminal (PT), a midpoint terminal (MT) and a negative terminal (NT) connected to the DC bus (4);
a first capacitor (C1) connected between the positive terminal (PT) and the midpoint terminal (MT);
a second capacitor (C2) connected between the midpoint terminal (MT) and the negative terminal (NT);
wherein the DC-DC converter (10) comprises:
a first switching circuit (20) comprising active switches connected between the first DC port (10A), a first node (21) and a second node (22);
a second switching circuit (40) comprising active switches connected between the second DC port (10B), a first node (41) and a second node (42);
a resonant circuit (30) connected between the nodes (21, 22) of the first switching circuit (20) and the nodes (41, 42) of the second switching circuit (40);
a control circuit (50) for controlling power transfer from the first DC port (10A) to the second DC port (10B) by controlling the active switches of the first and second switching circuits (20, 40);
wherein the second switching circuit (40) comprises:
a first switch (Q1) connected between the positive terminal (PT) of the second port (10B) and the first node (41);
a second switch (Q2) connected between the first node (41) and the midpoint terminal (MT) of the second port (10B);
a third switch (Q3) connected between the midpoint terminal (MT) of the second port (10B) and the second node (42);
a fourth switch (Q4) connected between the second node (42) and the negative terminal (NT) of the second port (10B);
during a first interval (T1ref), alternating between an initial charging state (CS0), in which the resonant circuit (30) is charged by the DC source (B) and a first charging state (CS1) in which the first capacitor (C1) is charged by the resonant circuit (30);
during a second interval (T2ref), alternating between the initial charging state (CS0) and a second charging state (CS2) in which the second capacitor (C2) is charged by the resonant circuit (30).

10. The method according to claim 9, comprising the steps of:
controlling the second and third switches (Q2, Q3) to be on and the first and fourth switches (Q1, Q4) to be off during the initial charging state (CS0);
controlling the first and third switches (Q1, Q3) to be on and the second and fourth switches (Q2, Q4) to be off during the first charging state (CS1);
controlling the second and fourth switches (Q2, Q4) to be on and the first and third switches (Q1, Q3) to be off during the second charging state (CS2).

* * * * *